(No Model.)

J. J. MABRAY.
CUTTER FOR TRIMMING SOLES OF BOOTS OR SHOES.

No. 532,171. Patented Jan. 8, 1895.

WITNESSES:
Rufus B. Fowler
H. M. Fowler

INVENTOR
James J. Mabray

UNITED STATES PATENT OFFICE.

JAMES J. MABRAY, OF WORCESTER, MASSACHUSETTS.

CUTTER FOR TRIMMING SOLES OF BOOTS OR SHOES.

SPECIFICATION forming part of Letters Patent No. 532,171, dated January 8, 1895.

Application filed April 26, 1886. Serial No. 200,247. (No model.)

*To all whom it may concern:*

Be it known that I, JAMES J. MABRAY, a citizen of the United States, residing at Worcester, in the county of Worcester and State of Massachusetts, have invented a new and useful Improvement in Cutters for Trimming Soles of Boots or Shoes, of which the following is a specification, reference being had to the accompanying drawings, in which—

Figure 1:
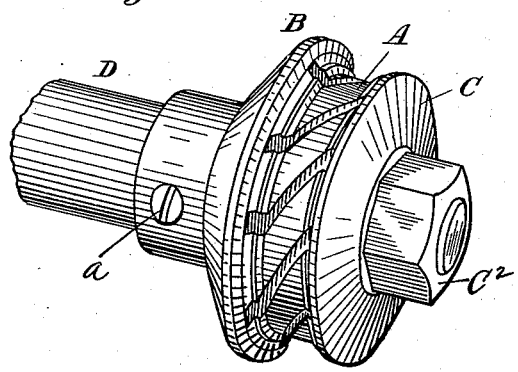
Figure 4:
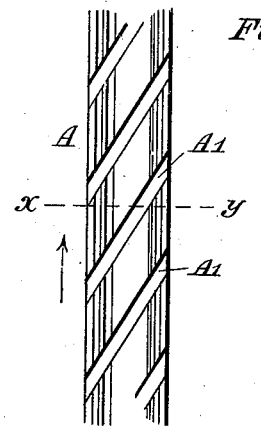
Figure 2:
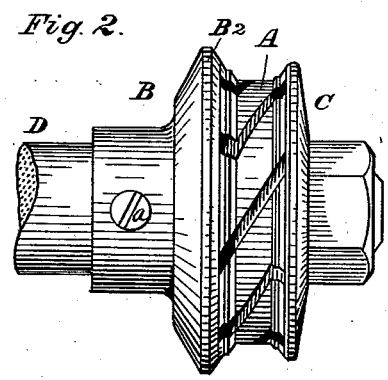
Figure 3:
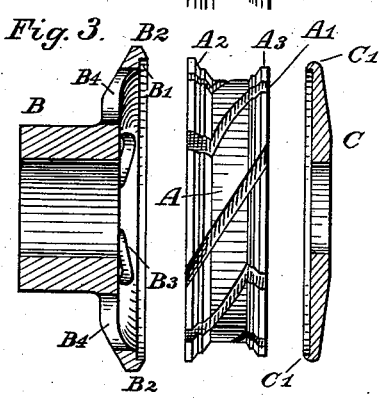
Figure 5:
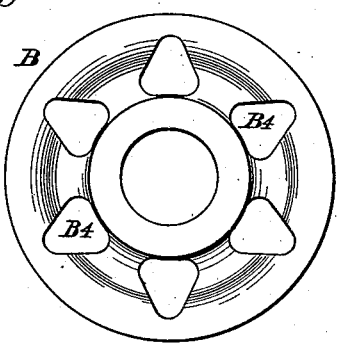
Figure 6:
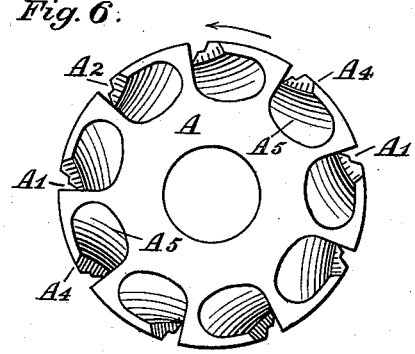

Figures 1 and 2 represent respectively, views in perspective, and elevation of one of my improved cutters. Fig. 3 shows the several parts constituting the "head" as separated with part of them in section. Fig. 4 is a diagram illustrating the angle of the cutting edges with reference to the axis of rotation of the head. Fig. 5 is a view of the shield B, and Fig. 6 is a detached view of the central block in which the cutting edges are formed.

Similar letters refer to similar parts in the several views.

In the cutter shown in the drawings a central cylindrical steel block A has a plain cylindrical surface, which is brought against, and forms the outer edge of the sole. Upon the upper and lower edges are formed beaded lips $A^2$ and $A^3$, Fig. 3, the lip $A^3$ trimming the upper, or welt, edge, of the sole, and the lip $A^2$ trimming the lower edge of the sole.

Chambers $A^5$ (Fig. 6) are formed passing through the block A, from side to side and obliquely to its axis of rotation and cutting edges are then made on the face, or outer surface by sewing the slits $A'$, through into each of the interior chambers, $A^5$; and backing off or giving a clearance to each section, forming cutting edges which like the chambers $A^5$, stand obliquely with the axis of the revolving "head."

To a spindle D, a cup-shaped shield B, is fastened by the screw $a$, said shield having its edge recessed at $B'$, to receive the central cylindrical block A, and overlap the edge of the lip $A^2$. A disk C, with a similar recess $C'$, fits the opposite, or upper, side of the block A, and overlaps the edge of the lip $A^3$.

The end of the spindle D, is screw threaded, and receives a nut $C^2$ by which the disk C, block A, and shield B, are firmly clamped together. The cup-shaped shield B, incloses an annular chamber $B^3$ between it and the side of the block A, with which openings $B^4$, through the shield B, communicate, allowing a current of air to pass freely through the openings $B^4$, chambers $A^5$, and slits $A'$, as the "head" revolves.

To the spindle D, rapid rotary motion is imparted and the edge of the sole presented to the action of the cutting edges in the common and well known manner. Each cutting edge made by the slits $A'$, is placed at such an angle to the axis of the revolving head, as indicated by the broken line $x, y$, Fig. 4, and at such a distance apart, that the action of each cutting edge begins before the action of the next preceding cutting edge has ceased, thus preventing the wavy appearance of the finished edge, and the slits are also so placed that their cutting edges will act on the upper or "welt" edge in advance of the central or lower section, which is necessary to the successful operation of the cutter.

I am aware that cutters have been heretofore used, having cutting edges placed obliquely to the axis of the revolving cutter. Such I do not herein claim, but

What I claim as my invention, and desire to secure by Letters Patent, is—

In a revolving cutter for trimming the edges of boots and shoes, the combination of a revolving spindle D, cylindrical block A having beaded lips $A^2$ and $A^3$ and a series of chambers $A^5$ placed obliquely to its axis of rotation and cutting edges formed by means of slits $A'$ communicating with said chambers, cup-shaped shield B recessed to receive the block A and having an annular chamber $B^3$ and openings $B^4$, disk C recessed to receive the block A, substantially as described.

JAMES J. MABRAY.

Witnesses:
H. M. FOWLER,
RUFUS B. FOWLER.